United States Patent
Yun et al.

(10) Patent No.: US 9,634,509 B2
(45) Date of Patent: Apr. 25, 2017

(54) METHOD FOR RAPID CHARGING AND ELECTRONIC DEVICE THEREOF

(71) Applicant: Samsung Electronics Co., Ltd., Gyeonggi-do (KR)

(72) Inventors: Chul-Eun Yun, Gyeonggi-do (KR); Ki-Sun Lee, Gyeonggi-do (KR); Chul-Woo Park, Gyeonggi-do (KR); Ku-Chul Jung, Seoul (KR); Young-Hee Ha, Gyeonggi-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 144 days.

(21) Appl. No.: 14/534,126

(22) Filed: Nov. 5, 2014

(65) Prior Publication Data

US 2015/0123599 A1    May 7, 2015

(30) Foreign Application Priority Data

Nov. 5, 2013    (KR) .................... 10-2013-0133791

(51) Int. Cl.
*H02J 7/00*    (2006.01)

(52) U.S. Cl.
CPC ............. *H02J 7/007* (2013.01); *H02J 7/0047* (2013.01)

(58) Field of Classification Search
CPC .. H02J 7/04; H02J 7/007; H02J 7/0045; H02J 7/0052
USPC .......................................... 320/107, 148–154
See application file for complete search history.

(56) References Cited

U.S. PATENT DOCUMENTS

| | | | |
|---|---|---|---|
| 5,444,353 A | * | 8/1995 | Shinohara ............. H02J 7/0081 320/148 |
| 7,825,635 B2 | | 11/2010 | Kim |
| 2008/0036426 A1 | | 2/2008 | Kung et al. |
| 2008/0084189 A1 | | 4/2008 | Kim |
| 2012/0098498 A1 | | 4/2012 | Asai |
| 2012/0299532 A1 | | 11/2012 | Seethaler et al. |

FOREIGN PATENT DOCUMENTS

| | | |
|---|---|---|
| JP | 2007166774 A | 6/2007 |
| JP | 2009-290906 | 12/2009 |
| KR | 100618773 B1 | 8/2006 |
| KR | 1020080011955 A | 2/2008 |

OTHER PUBLICATIONS

International Search Report dated Jan. 30, 2015 in connection with International Application No. PCT/KR2014/010469; 3 pages.
Written Opinion of International Searching Authority dated Jan. 30, 2015 in connection with International Application No. PCT/KR2014/010469; 8 pages.

* cited by examiner

*Primary Examiner* — Paul Dinh

(57) ABSTRACT

A method and an apparatus for rapid charging in an electronic device are provided. In a method for charging a battery of an electronic device, an operation environment of the electronic device is determined. A charging current corresponding to the operation environment of the electronic device is set. Battery charging is started using the set charging current. The battery is charged using a maximum allowed charging current, such that a battery charging time may be reduced.

8 Claims, 12 Drawing Sheets

METHOD FOR RAPID CHARGING AND ELECTRONIC DEVICE THEREOF

PRIORITY

The present application is related to and claims the benefit under 35 U.S.C. §119(a) of a Korean patent application filed in the Korean Intellectual Property Office on Nov. 5, 2013 and assigned Serial No. 10-2013-0133791, the entire disclosure of which is hereby incorporated by reference.

TECHNICAL FIELD

Various exemplary embodiments of the present disclosure relates to a method for rapid charging and an electronic device thereof.

BACKGROUND

Generally, a portable electronic device such as a cellular phone, a notebook computer, a camcorder, a Personal Digital Assistant (PDA), and the like has a secondary cell such as a rechargeable battery (for example, Nickel-Cadmium battery), a lead storage battery, a Nickel Metal Hydride Battery (NiMH), a Lithium Ion Battery, a Lithium Polymer Battery, a metal lithium battery, an air zinc storage battery, and a user may charge and use a battery by connecting the portable electronic device mounting the battery thereon to a charger. The charger may exist inside the portable electronic device or exist as a separate external device. The charger may be connected to an external power terminal to supply power applied from the external power terminal to the battery, thereby charging the battery. Also, the charger may control power applied from the external power terminal to be supplied constantly to the battery. Here, the external power source may be DC power output from an adapter (for example, Travel Adapter (TA)).

For example, the adapter converts AC power of 220V to a voltage of 5V to provide the same to a charger or a charging IC inside an electronic device, and the charger or the charging IC inside the electronic device converts a DC voltage of 5V provided from the adapter to a DC voltage of 2.8 V~4.35 V to control a charging current. Also, the charger or the charging IC may provide a controlled charging current to an internal battery inside the electronic device to charge the battery.

A charging current of the battery is set in advance and fixed by a manufacturer of an electronic device. The manufacturer may set a charging current in advance with consideration of an expected charging time, heat emission, and the like. Recently, as an electronic device such as a smartphone has a high performance in order to provide various functions (for example, an Internet search service, a DMB service, a location-based service, and a multimedia service), heat emission problem emerges. To solve this problem, the manufacturer sets a charging current passively. In other words, the manufacturer sets a charging current in advance such that surface heat emission of the electronic device does not exceed 45 degree with consideration when charging a battery under a state (referred to as a 'heavy use') where applications that cause much heat are executed inside the electronic device by a user.

However, since charging is performed using the same charging current set in advance even when a user does not use relevant applications, it is inefficient. In other words, since a charging current is set in advance with reference to an environment where predetermined heat emission occurs due to execution of an application, a battery may be charged using the charging current set in advance even under an environment where applications are not executed by a user.

SUMMARY

To address the above-discussed deficiencies, it is a primary object to provide a method and an apparatus for rapid charging in an electronic device.

Another aspect of the present disclosure is to provide a method and an apparatus for determining whether an electronic device is in heavy use and controlling a charging current.

Still another aspect of the present disclosure is to provide a method and an apparatus for displaying a popup window or a message window asking a user whether to perform charging in a rapid charging mode to control a charging current.

In accordance with an aspect of the present disclosure, a method provides for charging a battery of an electronic device. The method includes determining an operation environment of the electronic device. The method also includes setting a charging current corresponding to the operation environment of the electronic device. The method also includes starting battery charging using the set charging current.

In an embodiment of the present disclosure, the operation environment of the electronic device may include at least one of a processor occupy ratio, a set display brightness, a current consumption current, Radio Frequency (RF) transmission power, and a sensor operation for determining movement of the electronic device. In an embodiment of the present disclosure, the current consumption current comprises a consumed current inside the electronic device when an adapter is connected.

In an embodiment of the present disclosure, the method may further include measuring a current supplied from the adapter or a battery of the electronic device to an inside of the electronic device.

In an embodiment of the present disclosure, the method may further include setting a small charging current when the consumed current inside the electronic device is large and setting a large charging current when the consumed current inside the electronic device is small.

In an embodiment of the present disclosure, setting the charging current corresponding to the operation environment of the electronic device may include, when it is determined that the operation environment of the electronic device is not a heavy use state, setting the charging current to a first charging current, and when it is determined that the operation environment of the electronic device is a heavy use state, setting the charging current to a second charging current lower than the first charging current.

In an embodiment of the present disclosure, the first charging current may be a maximum charging current that may be raised up to a heat emission range allowable inside the electronic device, and the second charging current may include a charging current value set in advance by a manufacturer.

In an embodiment of the present disclosure, the method may further include displaying a popup window asking execution of a rapid charging mode, wherein the setting of the charging current corresponding to the operation environment of the electronic device may be performed when the rapid charging mode execution is not selected.

In an embodiment of the present disclosure, the method may further include, when the rapid charging mode execution is selected, entering a forced sleep mode to stop an application being executed or limit use of an application, and setting the charging current to a third charging current during the forced sleep mode.

In an embodiment of the present disclosure, the third charging current may be a maximum charging current that may be raised up to a heat emission range allowable inside the electronic device during the forced sleep mode.

In an embodiment of the present disclosure, the method may further include displaying a popup window informing information regarding stoppage of an application being executed, limit of application use, or a battery charging time reducible when the rapid charging mode is executed before entering the forced sleep mode.

In accordance with another aspect of the present disclosure, an apparatus provides for charging a battery of an electronic device. The apparatus includes a controller for determining an operation environment of the electronic device. The controller also sets a charging current corresponding to the operation environment of the electronic device. The apparatus also includes a charging unit for starting battery charging using the set charging current.

In an embodiment of the present disclosure, the operation environment of the electronic device may include at least one of a processor occupy ratio, a set display brightness, a current consumption current, Radio Frequency (RF) transmission power, and a sensor operation for determining movement of the electronic device.

In an embodiment of the present disclosure, when it is determined that the operation environment of the electronic device is not a heavy use state, the controller may set the charging current to a first charging current, and when it is determined that the operation environment of the electronic device is a heavy use state, the controller may set the charging current to a second charging current lower than the first charging current.

In an embodiment of the present disclosure, the first charging current may be a maximum charging current that may be raised up to a heat emission range allowable inside the electronic device, and the second charging current may include a charging current value set in advance by a manufacturer.

In an embodiment of the present disclosure, the controller displays a popup window asking execution of a rapid charging mode, and the setting of the charging current corresponding to the operation environment of the electronic device may be performed when the rapid charging mode execution is not selected.

In an embodiment of the present disclosure, when the rapid charging mode execution is selected, the controller may enter a forced sleep mode to stop an application being executed or limit use of an application, and set the charging current to a third charging current during the forced sleep mode.

In an embodiment of the present disclosure, the third charging current may be a maximum charging current that may be raised up to a heat emission range allowable inside the electronic device during the forced sleep mode.

In an embodiment of the present disclosure, the controller may display a popup window informing information regarding stoppage of an application being executed, limit of application use, or a battery charging time reducible when the rapid charging mode is executed before entering the forced sleep mode.

In accordance with still another aspect of the present disclosure, a method provides for charging an electronic device. The method may include determining whether an adapter is connected, when the adapter is connected. The method may also include measuring a consumed current inside the electronic device. The method may also include setting a charging current corresponding to the consumed current inside the electronic device. The method may also include starting battery charging using the set charging current.

In an embodiment of the present disclosure, the measuring of the consumed current inside the electronic device may include measuring a current supplied from the adapter or a battery of the electronic device to an inside of the electronic device.

In an embodiment of the present disclosure, the setting of the charging current corresponding to the consumed current inside the electronic device may include setting a small charging current when the consumed current inside the electronic device is large, and setting a large charging current when the consumed current inside the electronic device is small.

In an embodiment of the present disclosure, the method may further include, when the battery charging is completed, displaying a popup window or a state display informing ending of the battery charging.

In accordance with further another aspect of the present disclosure, a method provides for charging an electronic device. The method may include determining charging starts. The method may also include determining an active/inactive state of a display of the electronic device. The method may also include, when the display of the electronic device is in the inactive state, setting a charging current to a first charging current. The method may also include, when the display of the electronic device is in the active state, setting a charging current to a second charging current lower than the first charging current. The method may also include starting battery charging using the set charging current.

In an embodiment of the present disclosure, the first charging current may be a maximum charging current that may be raised up to an allowable heat emission range inside the electronic device in the inactive state of the display of the electronic device, and the second charging current may be a maximum charging current that may be raised up to an allowable heat emission range inside the electronic device in the active state of the display of the electronic device.

In an embodiment of the present disclosure, the method may further include, when rapid charging mode execution is selected, entering a forced sleep mode to stop an application being executed or limit use of an application, and setting a charging current corresponding to the forced sleep mode.

In an embodiment of the present disclosure, the method may further include, when the battery charging is completed, displaying a popup window informing ending of the battery charging or a state display.

In accordance with yet further another aspect of the present disclosure, an apparatus provides for charging a battery. The apparatus includes a controller for determining charging starts. The controller also, when the charging starts, determine an active/inactive state of a display of the electronic device. The apparatus also includes a charging unit for, when the display of the electronic device is in the inactive state, setting a charging current to a first charging current. The charging unit also, when the display of the electronic device is in the active state, sets a charging current to a second charging current lower than the first charging current. The charging unit also starts battery charging using the set charging current.

In an embodiment of the present disclosure, the first charging current may be a maximum charging current that may be raised to an allowable heat emission range inside the electronic device in the inactive state of the display of the electronic device, and the second charging current may be a maximum charging current that may be raised to an allowable heat emission range inside the electronic device in the active state of the display of the electronic device.

In an embodiment of the present disclosure, when rapid charging mode execution is selected, the controller may enter a forced sleep mode to stop an application being executed or limit use of an application, and set a charging current corresponding to the forced sleep mode.

In an embodiment of the present disclosure, when the battery charging is completed, the controller may display a popup window informing ending of the battery charging or a state display.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. The following description with reference to the accompanying drawings is provided to assist in a comprehensive understanding of exemplary embodiments of the disclosure as defined by the claims and their equivalents. Descriptions of well-known functions and constructions are omitted for clarity and conciseness. The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure are provided for illustration purpose only and not for the purpose of limiting the disclosure as defined by the appended claims and their equivalents.

Hereinafter, a method and an apparatus for rapid charging in an electronic device according to the present disclosure are described.

Figure 1:
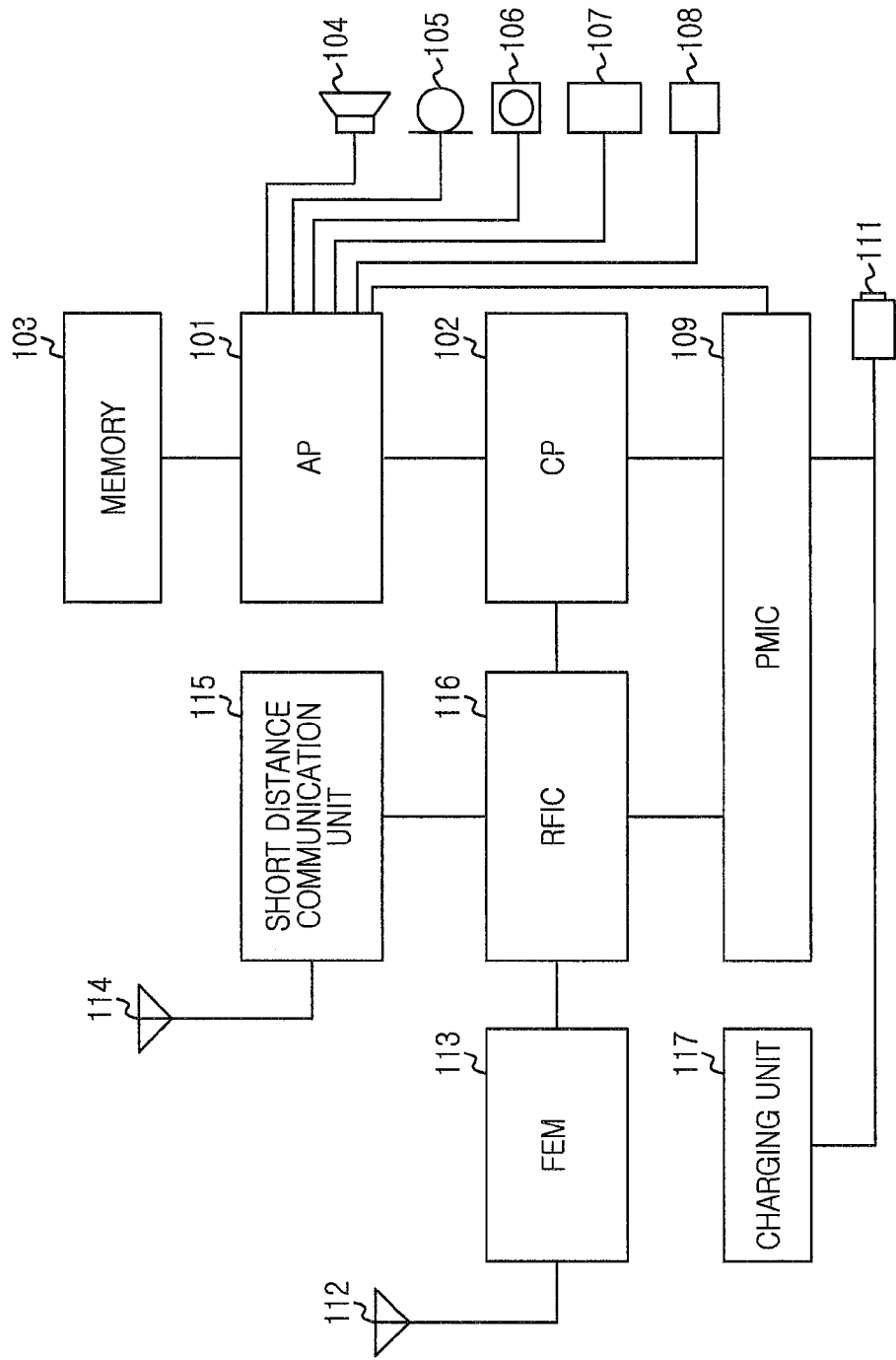
FIG. 1 illustrates a block diagram of an electronic device according to an embodiment of the present disclosure.

FIG. 1 illustrates a block diagram of an electronic device according to an embodiment of the present disclosure.

The electronic device 100 may be a device such as a portable terminal, a mobile terminal, a mobile pad, a media player, a tablet computer, a handheld computer, or a Personal Digital Assistant (PDA), and the like. Also, the electronic device 100 may be an arbitrary electronic device including a device combining two or more functions among these devices.

Referring to FIG. 1, the electronic device 100 may include an application processor (AP) 101, a communication processor (CP) 102, a memory 103, a speaker 104, a microphone 105, a camera module 106, a display 107, a touch panel 108, a Power Manager Integrated Circuit (PMIC) 109, a battery 111, a cellular antenna 112, a Front End Module (FEM) 113, a short distance communication antenna 114, a short distance communication unit 115, a Radio Frequency Integrated Circuit (RFIC) 116, and a charging unit 117.

The application processor (AP) 101 performs an overall role of the electronic device 100, and may support an operation processing function, a function of reproducing contents of various formats such as audio/image/video, and the like, a graphic engine, and the like. The AP 101 may drive an Operating System (OS) applied to the electronic device 100 and various functions, and the like, and integrate all of numerous functions such as a core, a memory, a display system/controller, a multimedia encoding/decoding codec, a 2D/3D accelerator engine, an Image Signal Processor (ISP), a camera, an audio, a modem, various High and Low speed Serial/Parallel connectivity interface, and the like into one chip. The AP 101 drives an OS and applications, and may be a System-On-Chip (SOC) where functions for controlling various system devices/interfaces are gathered as one chip.

The CP 102 may enable voice communication and/or data communication, and compress or decompress voice data or image data. The CP 102 may be a baseband modem or a baseband processor (BP), and the like. The CP 802 may perform communication using a Global System for Mobile Communication (GSM) communication scheme, an Enhanced Data GSM Environment (EDGE) communication scheme, a Code Division Multiple Access (CDMA) communication scheme, a W-CDMA communication scheme, a Long Term Evolution (LTE) communication scheme, and an Orthogonal Frequency Division Multiple Access (OFDMA) communication scheme.

The memory 103 may store a software-related program (instruction set) that may be executed by the above processors. The memory 103 may include a high speed random access memory such as one or more magnetic disk storages and/or a non-volatile memory, one or more optical storages and/or a flash memory (ex: NAND, NOR). A software may include an operating system program, a communication program, a camera program, a graphic program, one or more applications, a user interface program, a codec program, and the like. A terminology of a program may be expressed as a set of instructions or an instruction set or a program. An operating system program may use various functions of a communication program, a camera program, a graphic program, one or more applications, and a user interface program, a codec program via various Application Programming Interfaces (APIs). The memory 103 may further include an additional program (instructions) besides programs.

The speaker 104 may convert an electric signal to a voice signal in an audible frequency band and output the same. The microphone 105 may convert a voice signal to an electric signal.

The camera 106 may convert light reflected by an object for shooting into an electric signal. The camera 106 may include a Charged Coupled Device (CCD) or a Complementary Metal Oxide Semiconductor (CMOS), and the like.

The display 107 may output an electric signal in the form of visual information (ex: text, graphics, video, and the like). The display 107 may be one of an Electro Wetting Display (EWD), an E-Paper, a Plasma Display Panel (PDP), a Liquid Crystal Display (LCD), an Organic Light Emitting Diode (OLED), and an Active Matrix Organic Light Emitting Diodes (AMOLED).

The touch panel 108 may receive a touch. The touch panel may be one of a digitizer for a stylus pen, a capacitive overlay touch panel, a resistance overlay touch panel, a surface acoustic wave touch panel, and an infrared beam touch panel.

The PMIC 109 may perform a function of receiving primary power (for example, a battery 111) and converting the primary power into stable and efficient power used by a system, and supplying the same. The PMIC 109 may also perform a function of supplying power to a display such as an LCD and an AMOLED, and a keypad, and a lighting apparatus such as a flash, and driving the same. Since a display or a lighting apparatus uses a high voltage, efficient power management is used under a circumstance requiring a low power system, such that not only simple power management but also power management via a smart function such as brightness adjustment by ambient light is performed.

Also, the PMIC 109 may perform a temperature protection function for protecting a circuit at a predetermined temperature or more, an 12C interface function for communicating with a processor, an overvoltage protection function, an overcurrent protection function, and a reverse battery protection function for protecting a circuit when electrodes of a battery are falsely connected.

The FEM 113 may be a transceiver that may control a radio wave signal. The FEM 113 may connect the cellular antenna 112 and the RFIC 116, and separate transmission/reception signals. FEM 113 may perform filtering and amplification, and may include a reception end FEM mounting a filter that filters a reception signal therein, and a transmission end FEM mounting a Power Amplifier Module (PAM) that amplifies a transmission signal therein.

The short distance communication unit 115 may include various communication functions not processed by the processors 101 and 102, for example, WiFi, Bluetooth, Near Field Communication (NFC), a Universal Serial Bus (USB) or Global Positioning System (GPS), and the like.

The RFIC (ex: an RF transceiver) 116 may receive a radio wave from a base station, and convert a received high frequency wave into a low frequency band (baseband) that may be processed by a modem (ex: the communication processor 102). The RFIC 116 may modulate a low frequency wave processed by the modem in the form of a high frequency wave in order to transmit the same to a base station.

The charging unit 117 may supply a charging current to the battery 111 to charge the battery 111. In detail, the charging unit 117 may charge the battery 111 by converting power from an external apparatus (ex: a Travel Adapter (TA)) into a charging voltage and a charging current used for charging a battery, and supplying the same to the battery 111.

In various embodiments of the present disclosure, the charging unit 117 may supply a charging current to the battery 111 depending on an operation environment of the electronic device 100. For example, whether heavy use is currently performed is determined by a processor with consideration of whether one or more applications inside the electronic device are being executed by a user, or whether background applications are being executed, current consumption of an electronic device, or a processor occupy ratio, or RF TX power, and a result thereof is provided to the charging unit 117, and the charging unit 117 may supply a relevant charging current to the battery 111 depending on the heavy use state. The operation is described in detail with reference to flowcharts of FIGS. 3 to 7.

Figure 2:
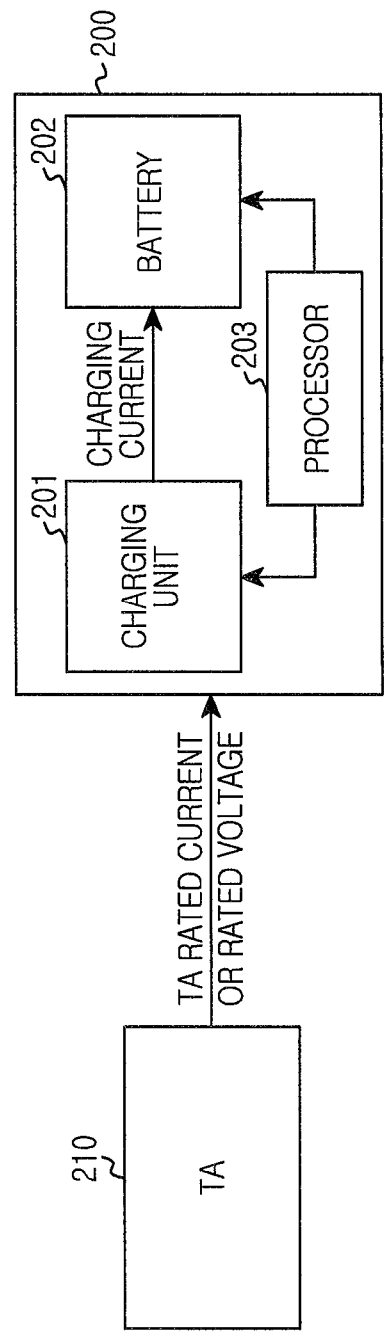
FIG. 2 illustrates a block diagram of an electronic device for charging a battery according to an embodiment of the present disclosure.

FIG. 2 illustrates a block diagram of an electronic device for charging a battery according to an embodiment of the present disclosure.

Referring to FIG. 2, the TA 210 may convert AC power of 100-220 V into a DC rated voltage or rated current and provide the same to the electronic device 200.

The electronic device 200 may include a charging unit 201, a battery 202, and a charging controller 203 (or a processor). The electronic device 200 is briefly illustrated using the elements related to various embodiments of the present disclosure in the electronic device 100 of FIG. 1.

In various embodiments, the charging unit 201 may control a charging current to charge the battery 202. The charging unit 201 may convert a DC voltage provided from the TA 210 into a charging voltage and a charging current used for charging the battery 202, and charge the battery 202 using the converted charging voltage and charging current. For example, the charging unit 201 may drop down a DC voltage of 5 V from the TA 210 to a charging voltage of 4.2 V.

The charging unit 201 may adjust the magnitude of a charging current using information regarding a charging current set in advance provided from the processor 203. The charging unit 201 may perform a constant current charging operation and a constant voltage charging operation when charging the battery 202. The charging unit 201 may proceed with the constant current charging operation that charges the battery 202 using a constant current, and the voltage of the battery 202 may increase. When the voltage of the battery 202 reaches a fully charged voltage (ex: 4.2 V), the charging unit 201 may make a transition to the constant voltage charging operation that charges the battery 202 using a charging voltage (4.2 V) of a constant voltage. While performing the constant voltage charging operation, the charging unit 201 reduces a charging current to the battery 202 depending on time. When the charging current reaches a cut-off current, it may be recognized that the charging of the battery 202 is completed.

The processor 203 may determine whether the TA 210 is connected via a power connection terminal. When the TA 210 is connected to the electronic device 200, the processor 203 may determine an operation environment of the electronic device, and set a charging current depending on the operation environment of the electronic device to provide information regarding the set charging current to the charging unit 201. Here, the operation environment of the electronic device may be determined by one or a combination of at least two of whether a six-axes sensor or an acceleration sensor operates, display brightness, an average processor occupy ratio, RF TX power, and system current detection.

For example, when it is not determined that the operation environment of the electronic device is in heavy use, the processor 203 may set a charging current to a first charging current. When it is determined that the operation environment of the electronic device is in heavy use, the processor 203 may set a charging current to a second charging current. The first charging current is greater than the second charging current, and may be a charging current that may be raised up to an allowable heat emission range. The second charging current is smaller than the first charging current, and may be a charging current that may be set with consideration when the electronic device is in heavy use. Also, when the battery is charged using the first charging current, a battery charging time may be shorter than a battery charging time when the battery is charged using the second charging current.

In various embodiments, when the TA 210 is connected to the electronic device 200, the charging controller 203 may display a popup window or a message window asking execution of a rapid charging mode. When the rapid charging mode is selected via a user interface, the electronic device enters a forced sleep mode to end applications being executed or limit execution of an application. Before entering the forced sleep mode, as illustrated in FIG. 8, the electronic device displays a forced sleep mode entry guide popup window, and sets a charging current to a first charging current. In contrast, when the rapid charging mode is not selected via the user interface, the electronic device determines an operation environment of the electronic device. When it is not determined that the operation environment of the electronic device is heavy use, the electronic device sets a charging current to a second charging current. In contrast, when it is determined that the operation environment of the electronic device is heavy use, the electronic device sets a charging current to a third charging current. Here, the magnitudes of the charging current have relation of the first charging current>the second charging current>the third charging current. The first charging current is greater than the second charging current, and is a maximum charging current that may be raised up to an allowable heat emission range in a forced sleep mode. The second charging current is smaller than the first charging current and greater than the third charging current, and is a maximum charging current that may be raised up to an allowable heat emission range in the current operation environment of the electronic device. The third charging current is smaller than the second charging current, and is a charging current that may be set with consideration when the electronic device is in heavy use.

Figure 10:
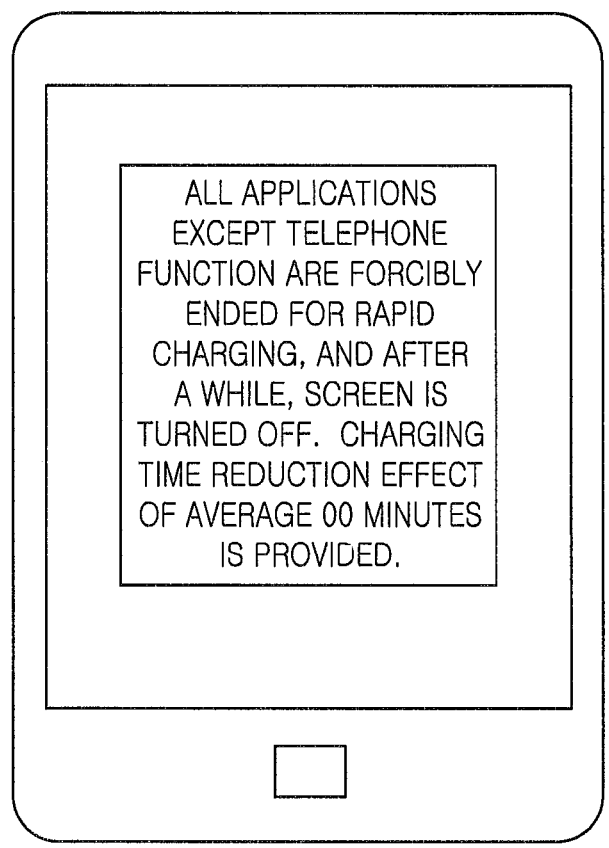
FIG. 10 illustrates a view of a guide popup window displayed when entering a rapid charging mode according to an embodiment of the present disclosure.

In other various embodiments, when it is not determined that an operation environment of the electronic device is in heavy use, the charging controller 203 sets a charging current to the second charging current. In contrast, when it is determined that an operation environment of the electronic device is in heavy use, the charging controller 203 displays a popup window or a message window asking execution of a rapid charging mode. When the rapid charging mode is selected via the user interface, the charging controller 203 enters a forced sleep mode to end applications being executed or limit execution of an application. Before entering the forced sleep mode, as illustrated in FIG. 10, the charging controller 203 displays a forced sleep mode entry guide popup window, and sets a charging current to a first charging current. Also, when the rapid charging mode is not selected via the user interface, the charging controller 203 sets a charging current to a third charging current. Here, the magnitudes of the charging current have relation of the first charging current>the second charging current>the third charging current. The first charging current is greater than the second charging current, and is a maximum charging current that may be raised up to an allowable heat emission range in a forced sleep mode. The second charging current is smaller than the first charging current and greater than the third charging current, and is a maximum charging current that may be raised up to an allowable heat emission range in the current operation environment of the electronic device. The third charging current is smaller than the second charging current, and is a charging current that may be set with consideration when the electronic device is in heavy use.

Also, in various embodiments, the charging controller 203 determines whether the TA 210 is connected via a power connection terminal. When the TA 210 is connected to the electronic device 200, the charging controller 203 detects a consumption current (referred to as a consumption current of the electronic device hereinafter) used inside the electronic device. The consumption current of the electronic device may be determined by detecting a current from a battery inside the electronic device or the TA 210 to the main body 200 of the electronic device. The charging controller 203 sets a charging current corresponding to the detected consumption current. For example, when the consumption current of the electronic device is large, a charging current is set small. When the consumption current of the electronic device is small, a charging current is set large.

Also, in various embodiments, the charging controller 203 determines whether the TA 210 is connected via the power connection terminal. When the TA 210 is connected to the electronic device 200, the charging controller 203 may detect whether the display of the electronic device is turned on/off, and set a charging current corresponding to the display on/off. For example, when the display of the electronic device is in the "off" state, the charging controller 203 may set a charging current to a second charging current. When the display of the electronic device is in the "on" state, the charging controller 203 may set a charging current to a first charging current smaller than the second charging current.

Figure 3:
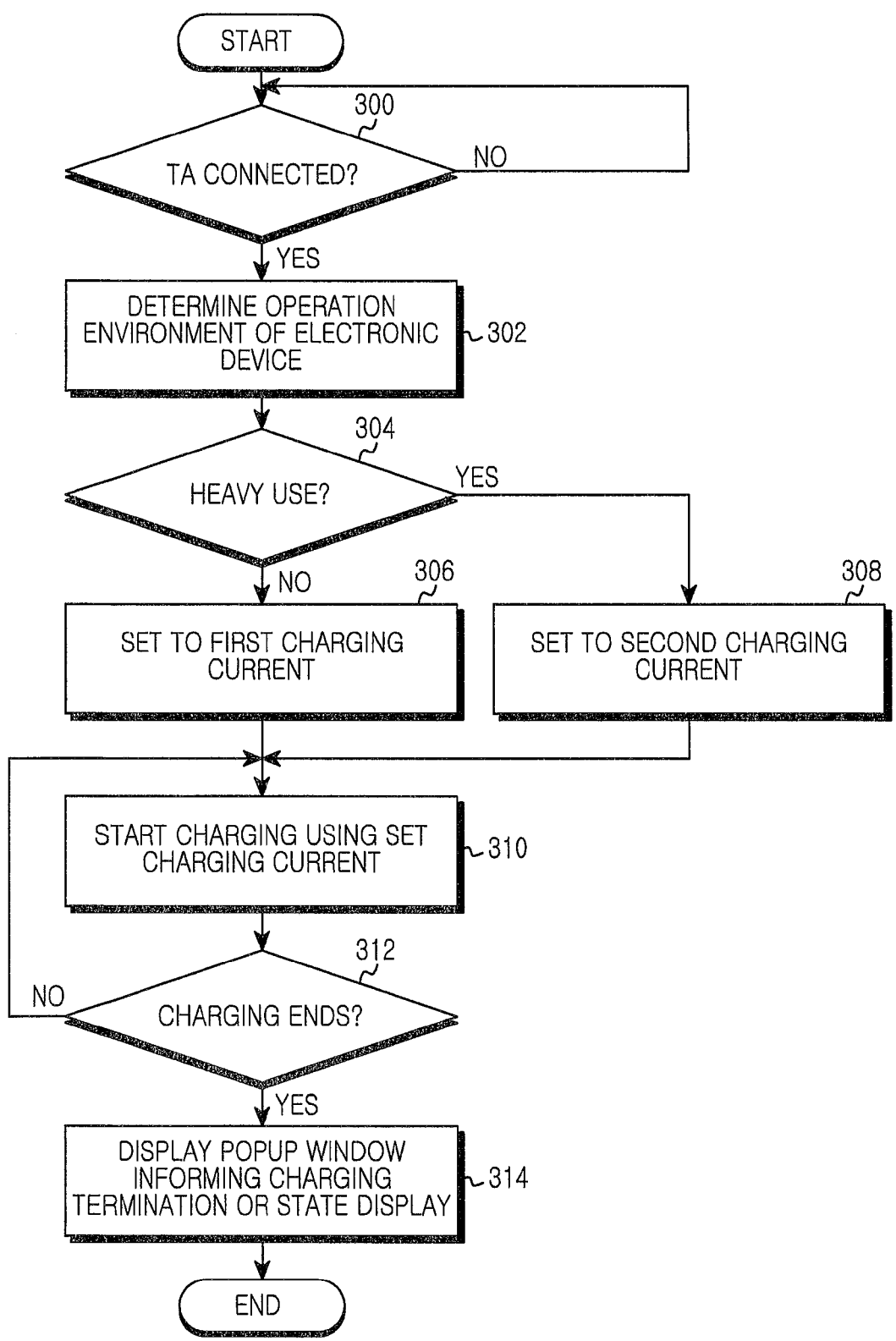
FIG. 3 illustrates a process for charging a battery of an electronic device according to an embodiment of the present disclosure.

FIG. 3 illustrates a process for charging a battery of an electronic device according to an embodiment of the present disclosure.

Referring to FIG. 3, the electronic device determines whether the TA is connected via a power connection terminal in operation 300, and determines an operation environment of the electronic device when the TA is connected to the electronic device. Here, the operation environment of the electronic device may be determined by one or a combination of at least two of whether a six-axes sensor or an acceleration sensor operates, display brightness, an average processor occupy ratio, RF TX power, and system current detection.

For example, whether a six-axes sensor or an acceleration sensor operates may be used to determine a purpose (ex: games, Internet search, and the like) for which a user uses the electronic device. The display brightness may be used for adaptively setting a charging current depending on display brightness with reference to display brightness setting. The average processor occupy ratio is determined by a processor operation clock for a predetermined time and may be used for determining whether lots of tasks are performed inside the electronic device. For example, a fact that a processor occupy ratio is high may mean lots of tasks are being processed inside the electronic device. In contrast, a fact that a processor occupy ratio is low may mean a few task is being processed inside the electronic device. Also, the RF TX power may be used for determining whether heat emission inside the electronic device is high or low. For example, under a weak electric field, RF TX power may be set high, such that heat emission may be high. Under a high electric field, RF TX power may be set low, such that heat emission may be low. Therefore, when RF TX power is high, a charging current may be lowered. When RF TX power is low, a charging current may be raised. The system consumption current detection may be used for determining whether heat emission inside the electronic device is high or low or determining whether lots of task processings are performed inside the electronic device. For example, when the system consumption current is high, a probability that heat emission is high is high. When the system consumption current is low, a probability that heat emission is low is low, or when the system consumption current is high, a probability that lots of task processings are performed is high, and when the system consumption current is small, a probability that lots of task processings are performed is low.

In other words, the electronic device may determine whether the electronic device is in heavy use currently with consideration of whether one or more applications are being executed by a user, or whether background applications are being executed, current consumption of the electronic device, or a processor occupy ratio.

When it is not determined that the operation environment of the electronic device is in heavy use in operation 304, the electronic device sets a charging current to a first charging current in operation 306. In contrast, it is determined that the operation environment of the electronic device is in heavy use in operation 304, the electronic device sets a charging current to a second charging current in operation 308.

After that, the electronic device may start battery charging using the first charging current or the second charging current set in operation 310. Here, the first charging current is greater than the second charging current, and may be a charging current that may be raised up to an allowable heat emission range inside the electronic device. The second charging current is smaller than the first charging current, and may be a charging current that may be set with consideration when the electronic device is in heavy use. Also, a battery charging time when the charging is performed using the first charging current is shorter than a battery charging time when the charging is performed using the second charging current.

For example, heat emission inside the electronic device corresponding to the current operation environment of the electronic device may be predicted, and the first charging current that allows the electronic device to reach an allowable heat emission range under the current operation range of the electronic device may be predicted.

In various embodiments, the first charging current corresponding when the electronic device is not in heavy use may be set in advance as an experiment value. Likewise, the second charging current corresponding when the electronic device is in heavy use may be set in advance by a manufacturer with consideration of a battery charging time and heat emission.

When the battery charging ends in operation 312, a popup window (or a message window) informing charge termination may be displayed. In various embodiments, a state display indicating charge completion may be displayed instead of a popup window.

When battery charging does not end in operation 312, operation 310 may be performed continuously.

Figure 4:
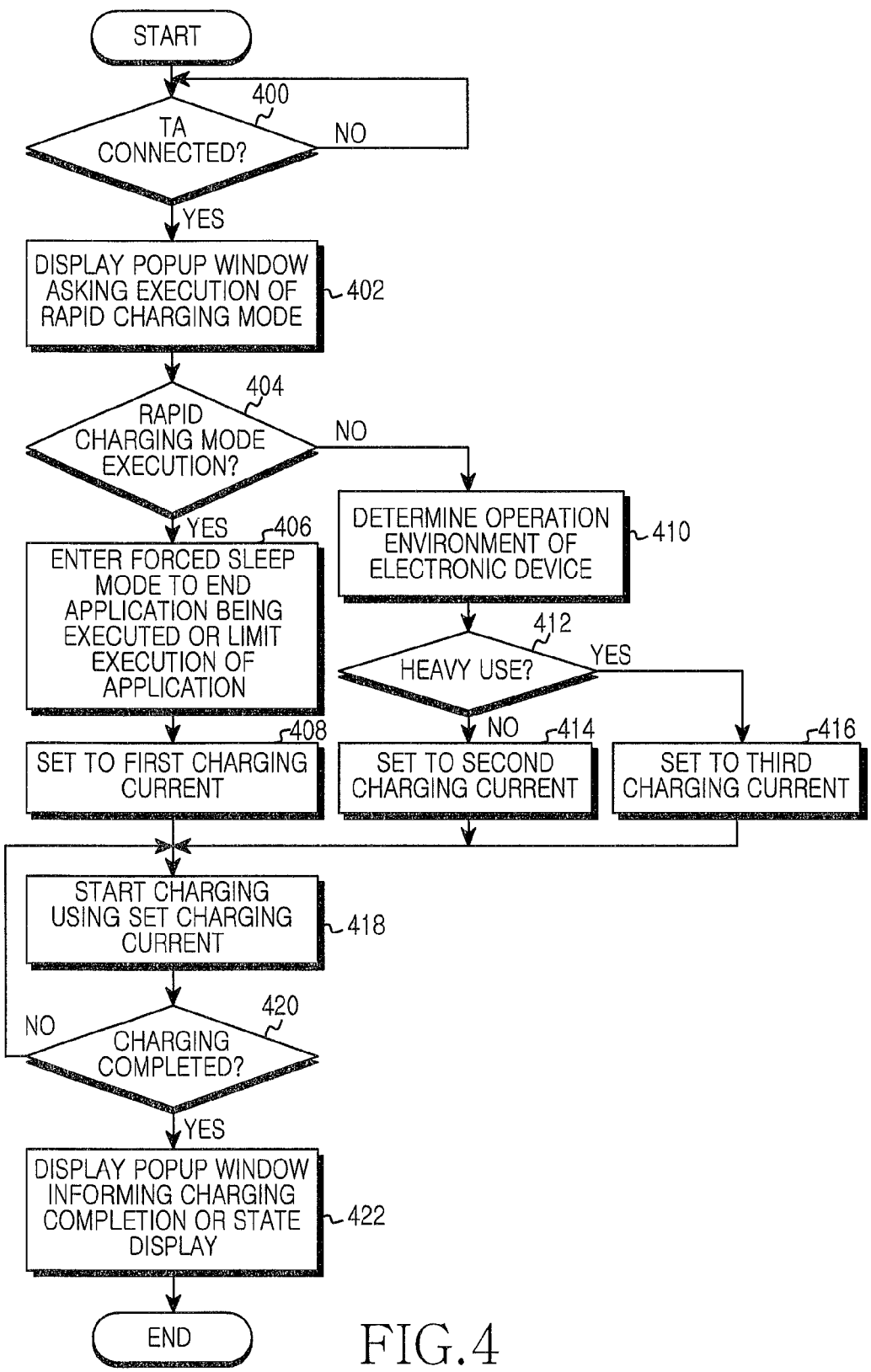
FIG. 4 illustrates a process for charging a battery of an electronic device according to another embodiment of the present disclosure.

FIG. 4 illustrates a process for charging a battery of an electronic device according to another embodiment of the present disclosure.

Figure 8A:
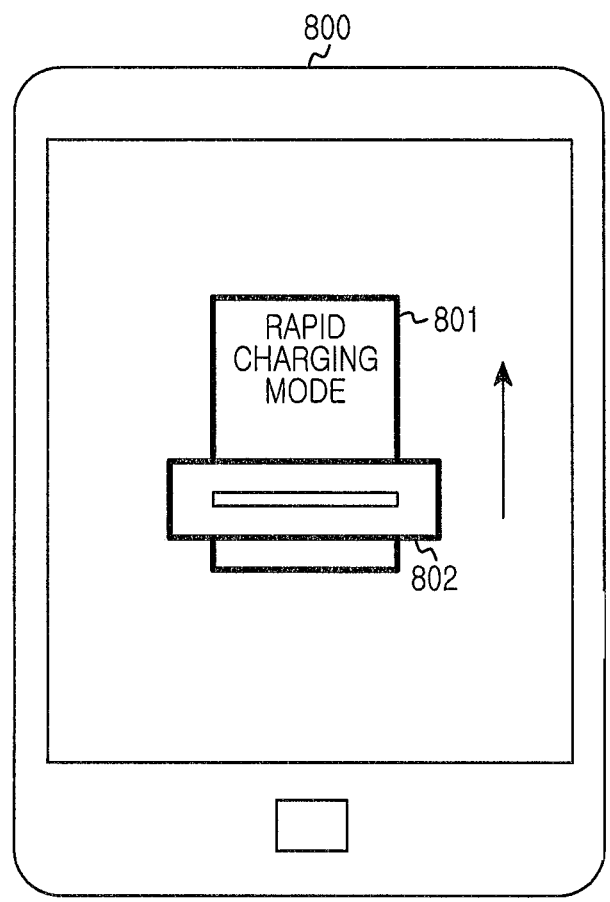
FIGS. 8A and 8B illustrate views of a user interface for entering a rapid charging mode according to an embodiment of the present disclosure.
Figure 8B:
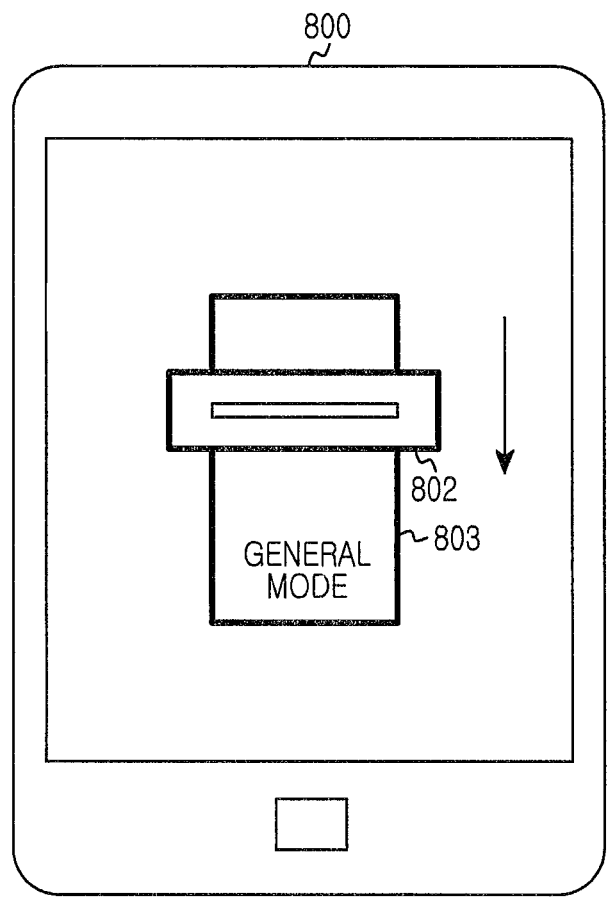
Figure 9:
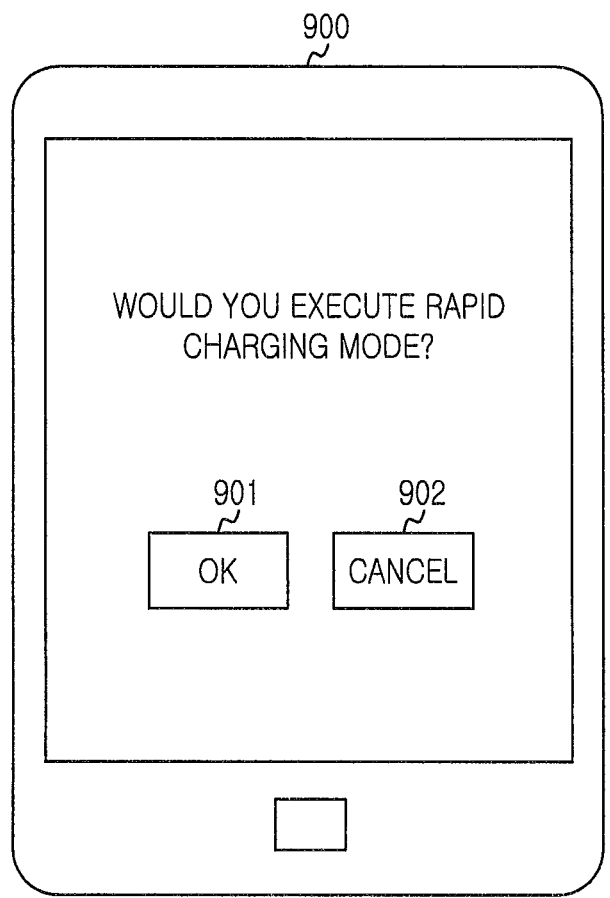
FIG. 9 illustrates a view of a user interface for entering a rapid charging mode according to an embodiment of the present disclosure.

Referring to FIG. 4, the electronic device determines whether the TA is connected via a power connection terminal in operation 400, and displays a popup window or a message window asking execution of a rapid charging mode when the TA is connected to the electronic device in operation 402. Here, the rapid charging mode is a mode where execution of an application is limited or an application being executed ends inside the electronic device, and denotes a mode where charging is performed using a maximum charging current within an allowable heat emission range. FIGS. 8A, 8B, 9 illustrate a popup window or a message window asking execution of a charging mode.

When a rapid charging mode is selected via a user interface in operation 404, operation 406 may be performed. When the rapid charging mode is not selected via the user interface in operation 404, operation 410 may be performed.

In operation 406, the electronic device enters a forced sleep mode to end an application being executed or limit execution of an application. Before entering the forced sleep mode, the electronic device may display a forced sleep mode entry guide popup window as illustrated in FIG. 10. Also, the electronic device sets a charging current to a first charging current in operation 408.

In operation 410, the operation environment of the electronic device is determined. Here, the operation environment of the electronic device may be determined by a combination of at least two of whether a six-axes sensor or an acceleration sensor operates, display brightness, an average processor occupy ratio, RF TX power, and system current detection. In another embodiment, the operation environment of the electronic device may be determined by whether a six-axes sensor or an acceleration sensor operates, display brightness, an average processor occupy ratio, RF TX power, or system current detection.

For example, whether a six-axes sensor or an acceleration sensor operates may be used to determine a purpose (ex: games, Internet search, and the like) for which a user uses the electronic device. The display brightness may be used for adaptively setting a charging current depending on display brightness with reference to display brightness setting. The average processor occupy ratio is determined by a processor operation clock for a predetermined time and may be used for determining whether lots of tasks are performed inside the electronic device. For example, a fact that a processor occupy ratio is high may mean lots of tasks are being processed inside the electronic device. In contrast, a fact that a processor occupy ratio is low may mean a few task is being processed inside the electronic device. Also, the RF TX power may be used for determining whether heat emission inside the electronic device is high or low. For example, under a weak electric field, RF TX power may be set high, such that heat emission may be high. Under a high electric field, RF TX power may be set low, such that heat emission may be low. Therefore, when RF TX power is high, a charging current may be lowered. When RF TX power is low, a charging current may be raised. The system consumption current detection may be used for determining whether heat emission inside the electronic device is high or low or determining whether lots of task processings are performed inside the electronic device. For example, when the system consumption current is high, a probability that heat emission is high is high. When the system consumption current is low, a probability that heat emission is low is low, or when the system consumption current is high, a probability that lots of task processings are performed is high, and when the system consumption current is small, a probability that lots of task processings are performed is low.

In other words, the electronic device may determine whether the electronic device is in heavy use currently with consideration of whether one or more applications are being executed by a user, or whether background applications are being executed, current consumption of the electronic device, or a processor occupy ratio.

When it is not determined that the operation environment of the electronic device is in heavy use in operation 412, the electronic device sets a charging current to a second charging current in operation 414. In contrast, it is determined that the operation environment of the electronic device is in heavy use in operation 412, the electronic device sets a charging current to a third charging current in operation 416.

After that, the electronic device may start battery charging using the first charging current, the second charging current, or the third charging current set in operation 418. Here, the magnitudes of the charging currents may have relation of the first charging current>the second charging current>the third charging current.

The first charging current is greater than the second charging current, and is a maximum charging current that may be raised up to an allowable heat emission range in a forced sleep mode, the second charging current is lower than the first charging current and higher than the third charging current, and is a charging current that may be raised up to an allowable heat emission range under the current operation environment of the electronic device, and the third charging current is lower than the second charging current and is a charging current that may be set with consideration when the electronic device is in heavy use.

In various embodiments, a first charging current within an allowable heat emission range may be set in advance during a forced sleep mode, a second charging current corresponding when an electronic device is not in heavy use may be also set as an experiment value corresponding to a current operation environment of the electronic device, and likewise, a third charging current corresponding when the electronic device is in heavy use, may be set in advance by a manufacturer with consideration of a battery charging time and heat emission.

When battery charging ends in operation 420, a popup window (or a message window) informing charge termination may be displayed in operation 422. In various embodiments, a state display indicating charge completion may be displayed instead of a popup window.

When battery charging does not end in operation 420, operation 418 may be performed continuously.

As described above, when a user agrees with execution of a rapid charging mode, explanation regarding the rapid charging mode is displayed as a pop-up and then all applications excluding a charging function and a communication function are ended, and a charging current may be set to a maximum charging current (ex: a first charging current) within an allowable heat emission range.

When the user does not agree with the rapid charging mode, whether the electronic device is in heavy use. A reference for determining this is a combination of whether a sensor operates, a display brightness condition, an average processor clock occupy ratio, RF transmission power, and a consumption current of the electronic device. Here, when it is determined that the electronic device is heavy use, a charging current may be set to a third charging current. When the electronic device is not in heavy use, a charging current may be set to a second charging current greater than a third charging current and smaller than the first charging current.

Figure 5:
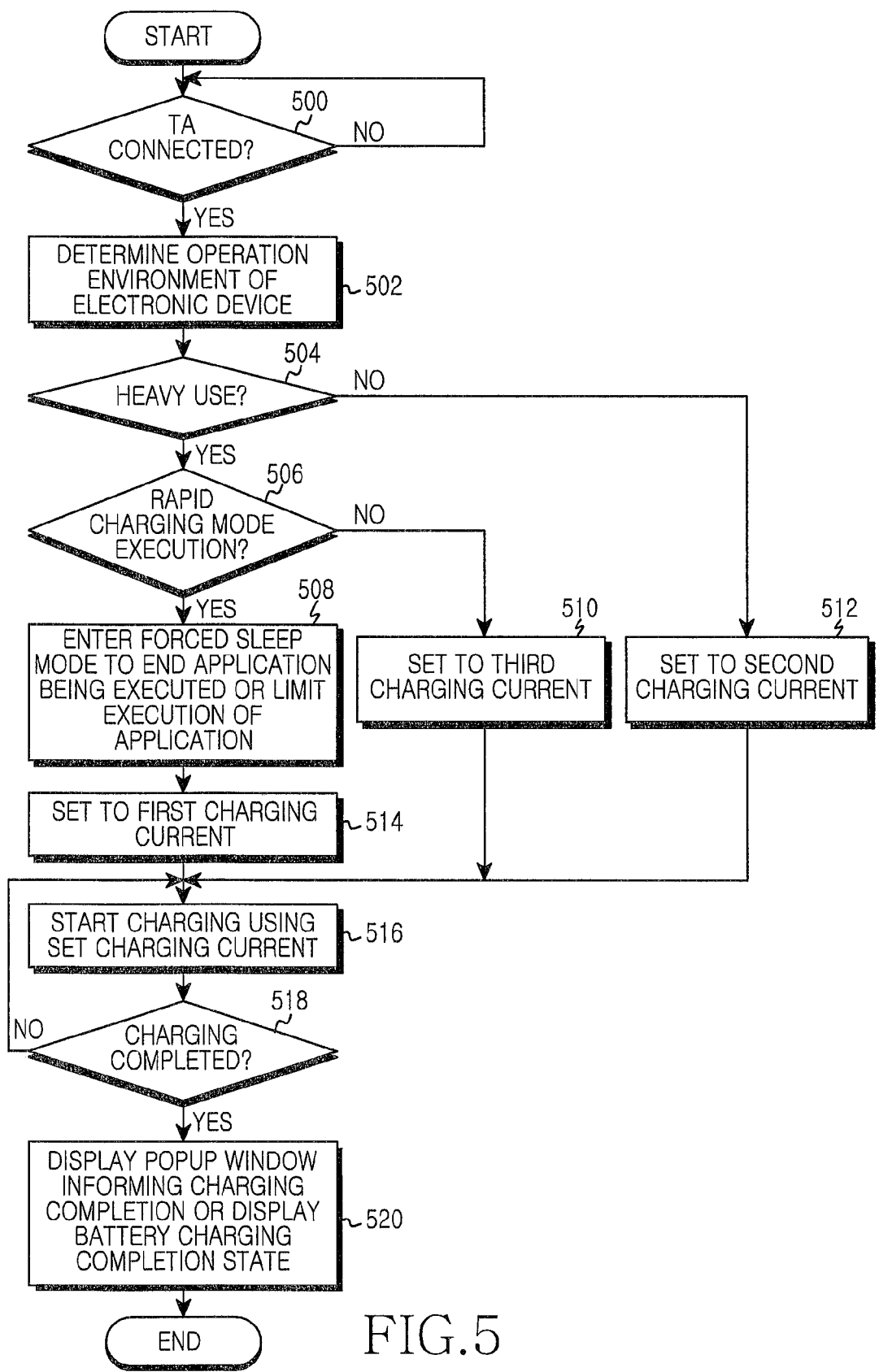
FIG. 5 illustrates a process for charging a battery of an electronic device according to still another embodiment of the present disclosure.

FIG. 5 illustrates a process for charging a battery of an electronic device according to still another embodiment of the present disclosure.

Referring to FIG. 5, the electronic device determines whether a TA is connected via a power connection terminal in operation 500. The electronic device determines an operation environment of the electronic device when the TA is connected to the electronic device. Here, the operation environment of the electronic device may be determined by a combination of at least two of whether a six-axes sensor or an acceleration sensor operates, display brightness, an average processor occupy ratio, RF TX power, and system current detection. In another embodiment, the operation environment of the electronic device may be determined by whether a six-axes sensor or an acceleration sensor operates, display brightness, an average processor occupy ratio, RF TX power, or system current detection.

For example, whether a six-axes sensor or an acceleration sensor operates may be used to determine a purpose (ex: games, Internet search, and the like) for which a user uses the electronic device. The display brightness may be used for adaptively setting a charging current depending on display brightness with reference to display brightness setting. The average processor occupy ratio is determined by a processor operation clock for a predetermined time and may be used for determining whether lots of tasks are being performed inside the electronic device. For example, a fact that a processor occupy ratio is high may mean lots of tasks are being processed inside the electronic device. In contrast, a fact that a processor occupy ratio is low may mean a few task is being processed inside the electronic device. Also, the RF TX power may be used for determining whether heat emission inside the electronic device is high or low. For example, under a weak electric field, RF TX power may be set high, such that heat emission may be high. Under a high electric field, RF TX power may be set low, such that heat emission may be low. Therefore, when RF TX power is high, a charging current may be lowered. When RF TX power is low, a charging current may be raised. The system consumption current detection may be used for determining whether heat emission inside the electronic device is high or low or determining whether lots of task processings are performed inside the electronic device. For example, when the system consumption current is high, a probability that heat emission is high is high. When the system consumption current is low, a probability that heat emission is low is low, or when the system consumption current is high, a probability that lots of task processings are performed is high, and when the system consumption current is small, a probability that lots of task processings are performed is low.

In other words, the electronic device may determine whether the electronic device is in heavy use currently with consideration of whether one or more applications are being executed by a user, or whether background applications are being executed, current consumption of the electronic device, or a processor occupy ratio.

When it is not determined that the operation environment of the electronic device is in heavy use in operation 504, the electronic device sets a charging current to a second charging current in operation 512.

In contrast, when it is determined that the operation environment of the electronic device is in heavy use in operation 504, the electronic device displays a popup window or a message window asking execution of the rapid charging mode in operation 506. Here, the rapid charging mode is a mode where execution of an application is limited or an application being executed ends inside the electronic device, and denotes a mode where charging is performed using a maximum charging current within an allowable heat emission range. FIGS. 8A, 8B, 9 illustrate a popup window or a message window asking execution of a charging mode.

When a rapid charging mode is selected via a user interface in operation 506, operation 508 may be performed. When the rapid charging mode is not selected via the user interface in operation 506, a third charging current may be set in operation 510.

In operation 508, the electronic device enters a forced sleep mode to end an application being executed or limit execution of an application. Before entering the forced sleep mode, the electronic device may display a forced sleep mode entry guide popup window as illustrated in FIG. 10. Also, the electronic device sets a charging current to a first charging current in operation 514.

After that, in operation 516, the electronic device starts battery charging using the set first charging current, second charging current, or third charging current. Here, the magnitudes of the charging current may be the first charging current>the second charging current>the third charging current.

The first charging current is greater than the second charging current, and is a maximum charging current that may be raised up to an allowable heat emission range in a forced sleep mode, the second charging current is lower than the first charging current and higher than the third charging current, and is a charging current that may be raised up to an allowable heat emission range under the current operation environment of the electronic device, and the third charging current is lower than the second charging current and is a charging current that may be set with consideration when the electronic device is in heavy use.

In various embodiments, a first charging current within an allowable heat emission range may be set in advance during a forced sleep mode, a second charging current corresponding when an electronic device is not in heavy use may be also set as an experiment value corresponding to a current operation environment of the electronic device, and likewise, a third charging current corresponding when the electronic device is in heavy use, may be set in advance by a manufacturer with consideration of a battery charging time and heat emission.

When battery charging ends in operation 518, a popup window (or a message window) informing charge termination may be displayed in operation 520. In various embodiments, a state display indicating charge completion may be displayed instead of a popup window.

When battery charging does not end in operation 518, operation 516 may be performed continuously.

Figure 6:
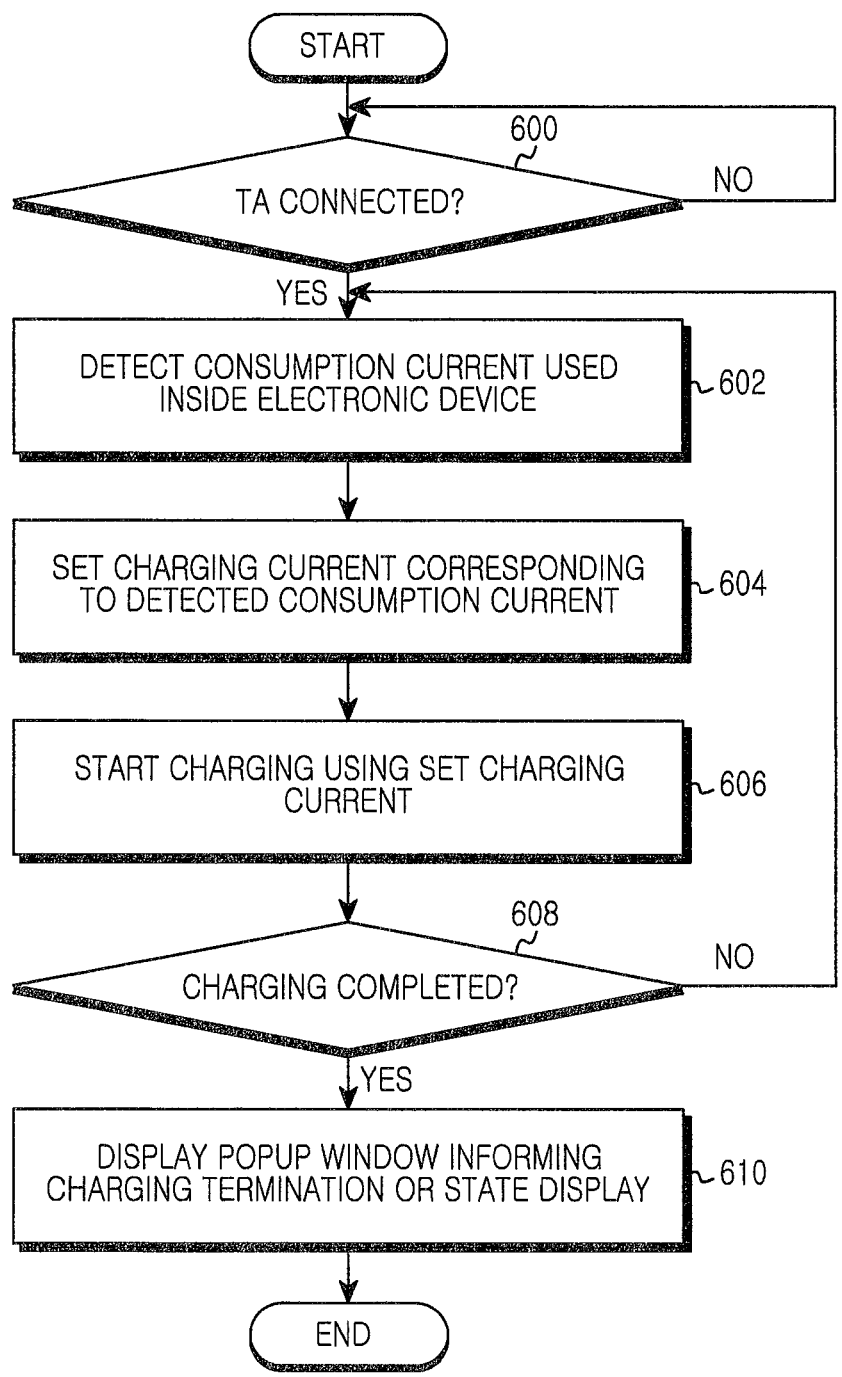
FIG. 6 illustrates a process for charging a battery of an electronic device according to further another embodiment of the present disclosure.

FIG. 6 illustrates a process for charging a battery of an electronic device according to further another embodiment of the present disclosure.

Referring to FIG. 6, the electronic device determines whether a TA is connected via a power connection terminal in operation 600. When the TA is connected to the electronic device in operation 602, the electronic device detects a consumption current (referred to as a consumption current of the electronic device hereinafter) used inside the electronic device. The consumption current of the electronic device may be determined by detecting a current from a battery inside the electronic device or the TA to the main body of the electronic device.

In operation 604, the electronic device may set a charging current corresponding to the detected consumption current. For example, when the consumption current of the electronic device is large, a charging current may become small. When the consumption current of the electronic device is small, a charging current may become large.

In operation 606, the electronic device starts charging using a charging current corresponding to the detected consumption current.

When battery charging ends in operation 608, a popup window (or a message window) informing charge termination may be displayed in operation 610. In various embodiments, a state display indicating charge completion may be displayed instead of a popup window.

When battery charging does not end in operation 608, operations 602 to 606 may be performed continuously.

Figure 7:
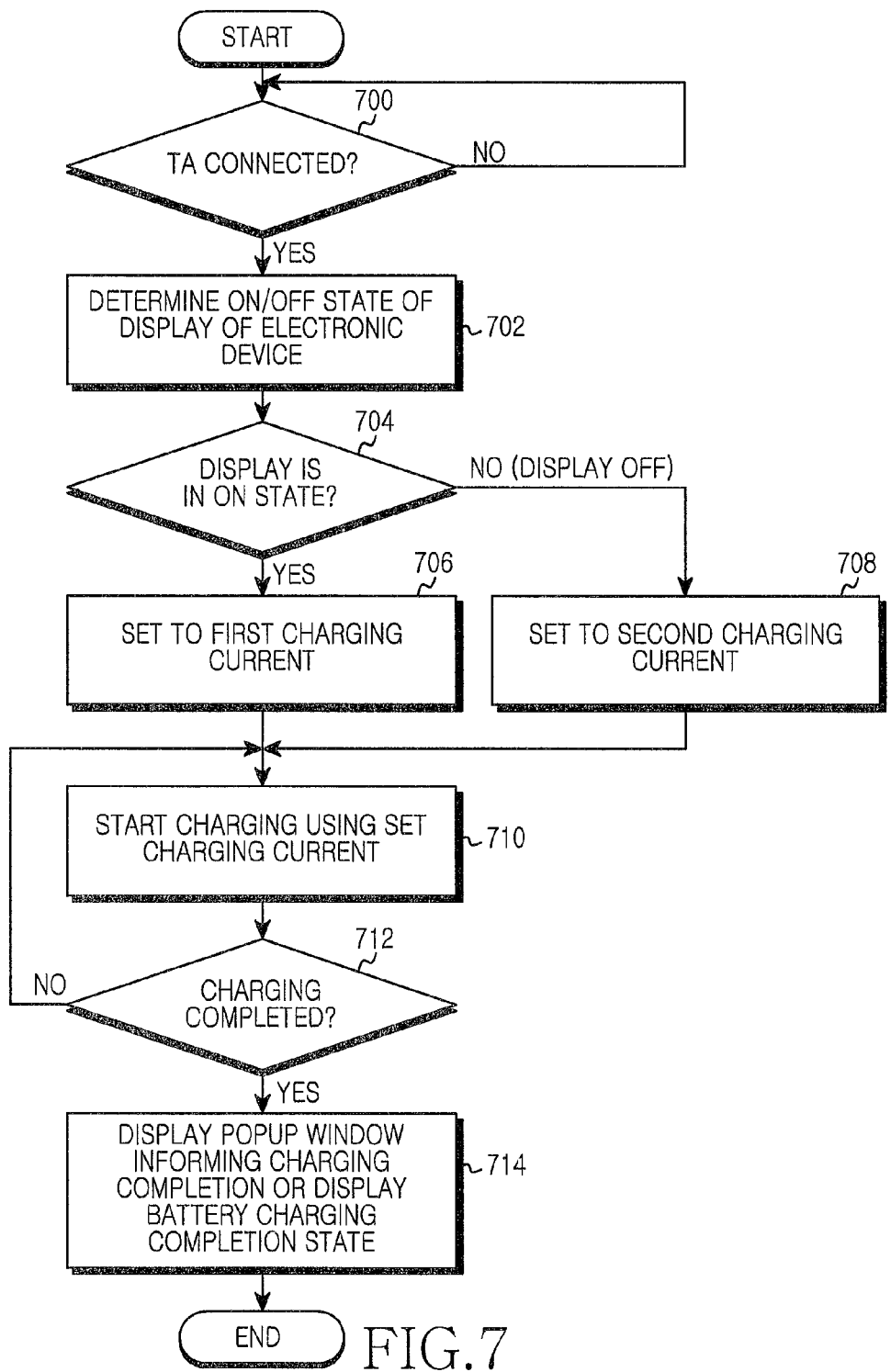
FIG. 7 illustrates a process for charging a battery of an electronic device according to yet further another embodiment of the present disclosure.

FIG. 7 illustrates a process for charging a battery of an electronic device according to yet further another embodiment of the present disclosure.

Referring to FIG. 7, the electronic device may determine whether a TA is connected via a power connection terminal in operation 700, and determine a display on/off state of the electronic device in operation 702. The display on/off state may be used in the same meaning as a display activation/deactivation state or a display wake-up/sleep state.

In operation 704, when the display of the electronic device is turned on, the electronic device may set a charging current to a first charging current in operation 706, and when the display of the electronic device is turned off, the electronic device may set a charging current to a second charging current. Here, the second charging current is greater than the first charging current, and may be a charging current that may be raised up to an allowable heat emission range inside the electronic device. The first charging current is smaller than the second charging current, and may be a charging current that may be set with consideration when the display of the electronic device is turned on. Also, a battery charging time when charging is performed using the second charging current may be shorter than a battery charging time when charging is performed using the first charging current.

For example, heat emission inside the electronic device corresponding to the current operation environment of the electronic device may be predicted, and the first charging current that allows the electronic device to reach an allowable heat emission range under the current operation range of the electronic device may be predicted.

In operation 710, the electronic device may start charging using a set charging current.

When the battery charging is completed in operation 712, a popup window (or a message window) informing charge termination may be displayed or a state display indicating charge completion may be displayed instead of a popup window in operation 714.

When battery charging does not end in operation 712, operation 710 may be performed continuously.

FIGS. 8A and 8B illustrate views of a user interface for entering a rapid charging mode according to an embodiment of the present disclosure.

Referring to FIG. 8A, when a selection bar 802 moves to "rapid charging mode" 801 via the user interface on a screen 800 of the electronic device, the electronic device may enter the rapid charging mode. Here, the rapid charging mode is a mode where an application being executed is stopped or execution of an application is limited, and then the electronic device starts charging using a maximum charging current within an allowable heat emission range.

Referring to FIG. 8B, when the selection bar 802 moves to "general mode" 803 via the user interface, the electronic device may enter the general mode. Here, the general mode is a mode that starts charging using a charging current set on the assumption that the electronic device is in heavy use.

FIG. 9 illustrates a view of a user interface for entering a rapid charging mode according to an embodiment of the present disclosure.

Referring to FIG. 9, when an OK button 901 is selected via the user interface on the screen 900 of the electronic device, the electronic device may enter the "rapid charging mode". When a cancel button 902 is selected, the electronic device may enter the "general mode".

FIG. 10 illustrates a view of a guide popup window displayed when entering a rapid charging mode according to an embodiment of the present disclosure.

Referring to FIG. 10, when entering a forced sleep mode, the electronic device may inform that a currently executed application is forcibly ended or information regarding a reduced battery charging time when charging is performed using the rapid charging mode may be provided.

Figure 11:
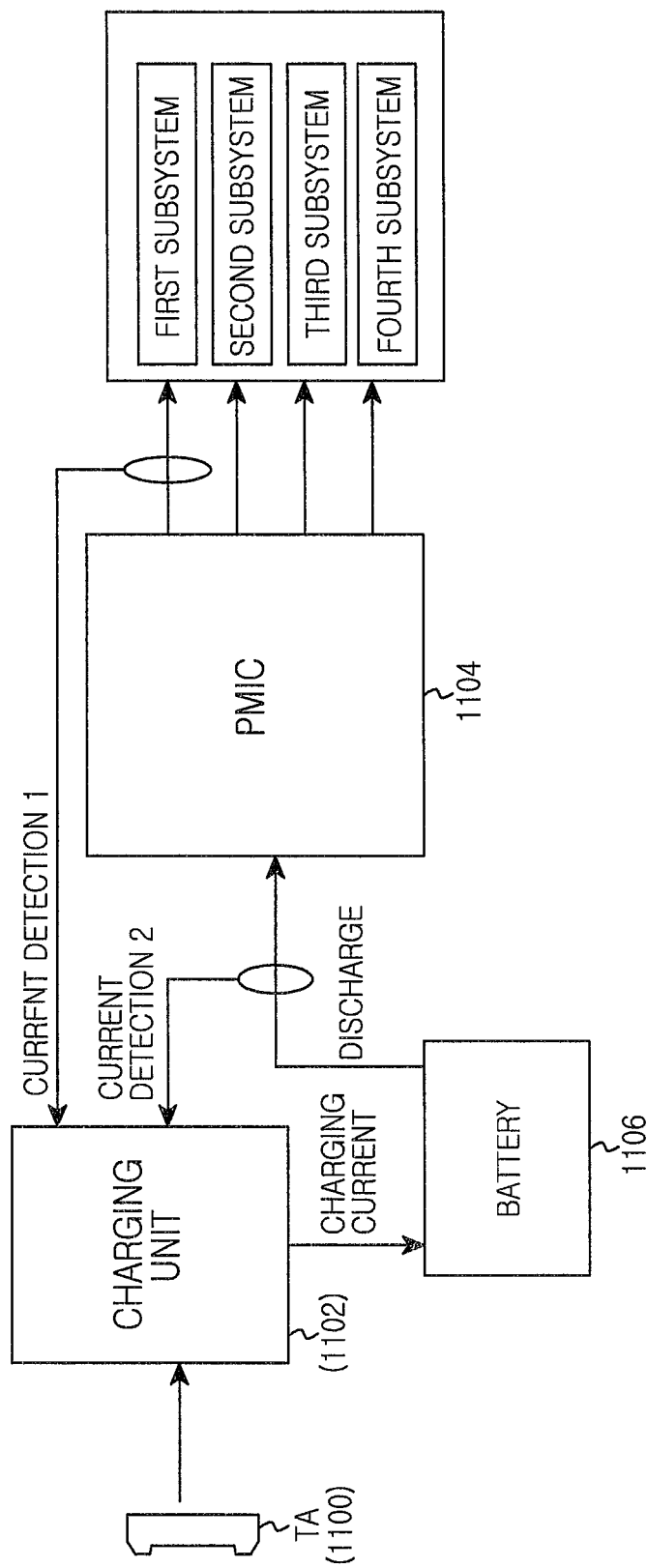
FIG. 11 illustrates a block diagram of detecting a consumed current inside an electronic device according to an embodiment of the present disclosure.

FIG. 11 illustrates a block diagram of detecting a consumed current inside an electronic device according to an embodiment of the present disclosure.

Referring to FIG. 11, a TA 1100 may convert AC power of 100~220 V to a DC rated voltage or rated current to provide the same to a charging unit 1102, and the charging unit 1102 may convert a rated voltage or a rated current of the TA 1100 to a charging current and provide the same to a battery 1106 to charge a battery. The battery 1106 supplies power used for an operation of the electronic device to a PMIC 1104, and the PMIC 1104 may convert power from the battery 1106 to stable and efficient power used by subsystems (ex: a processor, a display, a speaker, a microphone, and the like), and supply the same. Therefore, a consumption current inside the electronic device may be determined by detecting a current supplied from the battery 1106 to the PMIC 1104, or detecting a current supplied from the PMIC 1104 to a relevant subsystem.

Though various embodiments of the present disclosure have exemplarily described a charging environment that uses a TA, it is obvious that the present disclosure is also applicable to an environment that uses a wireless charging method besides the TA charging method.

As described above, a charging current is controlled with consideration of an operation state of the electronic device, such that the battery may be charged using a maximum allowed charging current while a heat emission condition is met.

Also, the battery is charged using a maximum allowed charging current while a heat emission condition is met, such that a battery charging time may be reduced.

Also, when a user desires rapid charging, execution of an application may be limited or an application being executed may be stopped while the battery is charged, such that a user interface that meets various consumer desires may be provided.

Methods according to embodiments described in claims and/or the specification of the present disclosure may be implemented in the form of hardware, software, or a combination of hardware and software.

In an embodiment, a computer-readable storage medium storing one or more programs (a software module) may be provided when having an implementation using software. One or more programs stored in the computer-readable storage medium are configured for execution by one or more processors inside the electronic devices. One or more programs include instructions for executing methods according to embodiments described in claims and/or the specification of the present disclosure.

This program (a software module, software) may be stored in a random access memory, a non-volatile memory including a flash memory, Read Only memory (ROM), Electrically Erasable Programmable Read Only Memory (EEPROM), a magnetic disc storage device, a Compact Disc-ROM (CD-ROM), Digital Versatile Discs (DVDs), or other types of optical storage devices, and a magnetic cassette. Alternatively, this program may be stored in a memory configured using a combination of a portion or all of these.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A method for charging an electronic device, the method comprising:
   determining whether a display of the electronic device is in an active state or an inactive state;

if the display of the electronic device is in the inactive state, charging a battery using a first charging current based on a charging current from an external power source, and if the display of the electronic device is in the active state, charging the battery using a second charging current based on the charging current from the external power source, wherein the second charging current is lower than the first charging current;

wherein the first charging current is a maximum charging current that is raised up to an allowable heat emission range inside the electronic device in the inactive state of the display of the electronic device, and wherein the second charging current is a maximum charging current that is raised up to an allowable heat emission range inside the electronic device in the active state of the display of the electronic device.

2. The method of claim 1, further comprising:
if a rapid charging mode execution is selected, entering a forced sleep mode state to stop an application being executed or limit use of the application; and
setting the charging current corresponding to the forced sleep mode state.

3. The method of claim 1, further comprising:
if the battery charging is completed, displaying a popup window that one of indicates that the battery charging is completed or displays a state of the charging.

4. The method of claim 1, further comprising determining a voltage level of the battery; and
if the battery has a fully charged voltage, charging the battery using a constant charging voltage.

5. An electronic device for charging a battery, the electronic device comprising:
a display of the electronic device; and
a controller configured to:
determine whether the display of the electronic device is in an active state or an inactive state;
if the display of the electronic device is in the inactive state, charge a battery using a first charging current based on a charging current from an external power source, and if the display of the electronic device is in the active state, charge the battery using a second charging current based on the charging current from the external power source, wherein the second charging current is lower than the first charging current;

wherein the first charging current is a maximum charging current that is raised up to an allowable heat emission range inside the electronic device in the inactive state of the display of the electronic device, and wherein the second charging current is a maximum charging current that is raised up to an allowable heat emission range inside the electronic device in the active state of the display of the electronic device.

6. The electronic device of claim 5, wherein responsive to rapid charging mode execution being selected, the controller is configured to enter a forced sleep mode to stop an application being executed or limit use of the application, and set the charging current corresponding to the forced sleep mode.

7. The electronic device of claim 5, wherein responsive to completion of the battery charging, the controller is configured to cause the display to display a popup window that one of indicates that the battery charging is completed or displays a state of the charging.

8. The electronic device of claim 5, wherein the controller is further configured to determine a voltage level of the battery; and
if the battery has a fully charged voltage, the controller is configured to charge the battery using a constant charging voltage.

* * * * *